United States Patent [19]

Dutton et al.

[11] Patent Number: 4,689,928
[45] Date of Patent: Sep. 1, 1987

[54] ARCHITECTURAL PLATE GLASS SUPPORT SYSTEM

[76] Inventors: Hugh J. Dutton, 31 Rue Des Thermopyles, Paris; Martin Francis, 6 Avenue Thiers, Antibes, both of France

[21] Appl. No.: 851,196

[22] Filed: Apr. 14, 1986

[30] Foreign Application Priority Data

Apr. 15, 1985 [FR] France ............................ 85 06179

[51] Int. Cl.⁴ .............................................. E04B 1/40
[52] U.S. Cl. ........................................ 52/235; 52/506; 52/741; 403/76; 403/143
[58] Field of Search .................. 52/235, 506, 508, 509, 52/512, 741, 745, 747; 403/76, 90, 122, 143

[56] References Cited

U.S. PATENT DOCUMENTS

| | | | |
|---|---|---|---|
| 2,900,196 | 8/1959 | Nienke | 403/143 X |
| 3,803,685 | 4/1974 | Muhn | 403/76 X |
| 4,070,835 | 1/1978 | Reverend et al. | 52/235 |
| 4,266,883 | 5/1981 | Riester et al. | 403/122 X |
| 4,483,122 | 11/1984 | Crandell | 52/747 |
| 4,581,868 | 4/1986 | McCann | 52/235 X |

Primary Examiner—J. Karl Bell
Attorney, Agent, or Firm—Townsend and Townsend

[57] ABSTRACT

A mechanical joint supports vertically extending plate glass using an articulated joint to accommodate some relative movement between the support joint and the plate glass. The joint includes a stem, one end secured to a support structure and the other being a solid sphere, and a head. The head has a spherical opening which mounts over the solid sphere. The plate glass has an opening sized to fit over the one end of the stem and onto the head. A jam nut threads onto the head to secure the plate glass between the nut and an enlarged outer end of the head. A resilient O-ring is mounted between the head and stem and acts as a shock absorber for pivotal movement of the head relative to the stem. The support structure includes prestressed cables connected to struts, the struts being pivotally connected to the stems. The invention provides substantially moment-free support of an array of glass plates positioned edge to edge while permitting limited deformation due to wind load.

24 Claims, 3 Drawing Figures

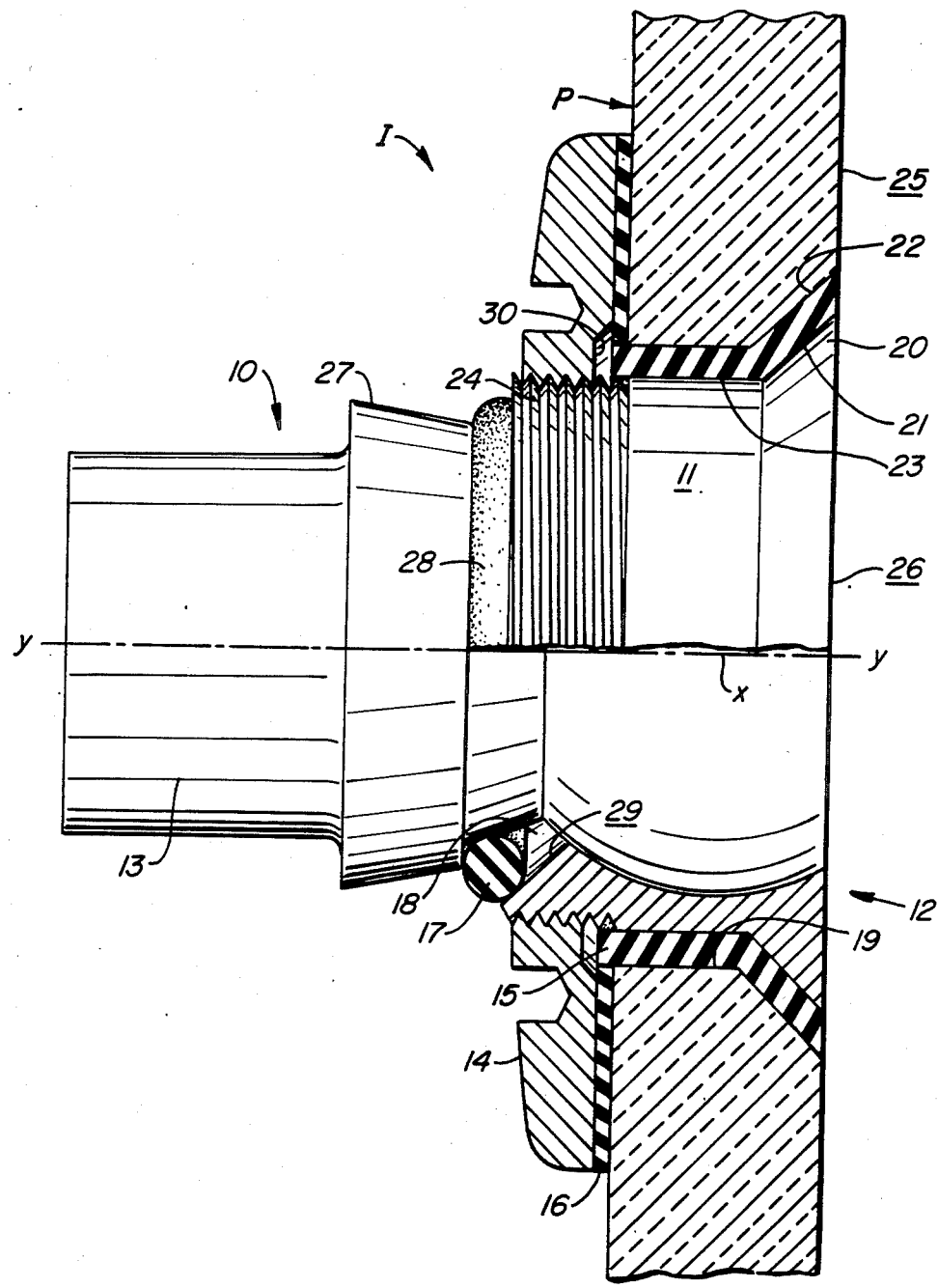
FIG._1.

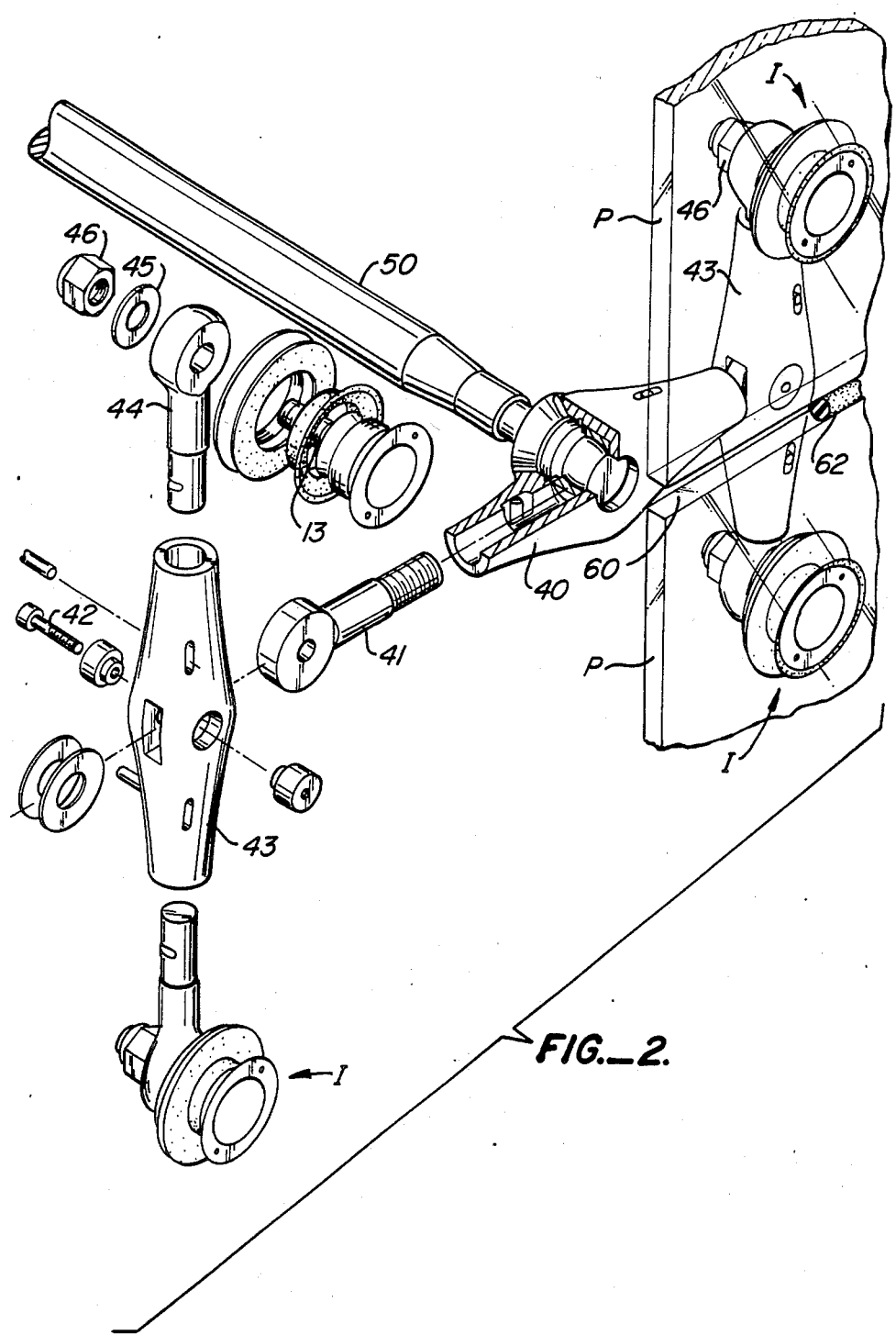
FIG._2.

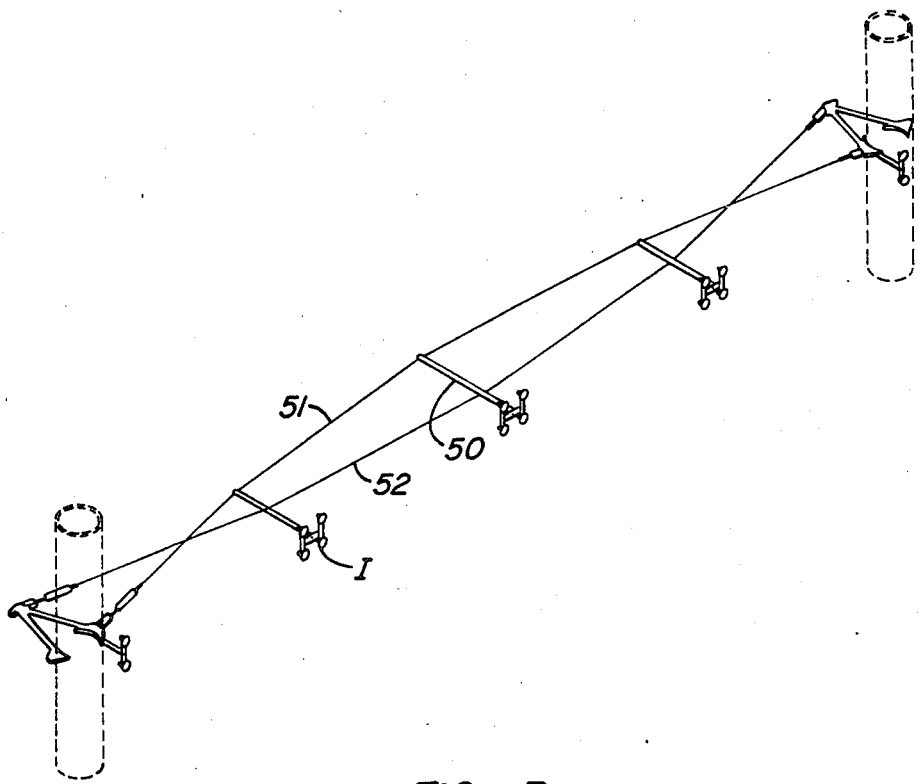
FIG._3.

ARCHITECTURAL PLATE GLASS SUPPORT SYSTEM

BACKGROUND OF THE INVENTION

The present invention relates to systems for vertically mounting plates of glass or other materials to a support structure, more particularly to a mechanical joint for mounting large glass plates to a support structure and the wall created thereby.

It is a common architectural practice to construct the exterior walls of buildings of toughened glass. Under present manufacturing constraints, the largest practical plate available is of about 2 m width and up to 3 m length. The thickness can vary generally from 6 mm to 16 mm, a common thickness being 12 mm. Such plates are brittle and heavy and the damage resulting from fracture after installation can be very serious. Such plates are normally affixed at their edges to rigid supporting frame members which, however, interrupt the continuity of the facade. Systems have been proposed for avoiding the use of such frames but only through the use of other undesirable constraints. Thus, the present inventors have exhibited a structure designed for interior use where wind force is not a problem and where plates of glass are arranged edge to edge with the edges sealed by a resilient silicone sealant. The plates are supported by riged mountings secured through bores in the glass plates. It has also been proposed in EP-A-136064 to arrange double glazed panels edge to edge to provide a continuous outer facade. However, the necessary reinforcement against bending stresses is provided by the use of fins or other rigid structure extending at right angles to the glass plates and which interrupt vision from the interior. This arrangement also utilizes rigid bolts inserted through bores in the glass plates.

SUMMARY OF THE INVENTION

The problem of enabling the construction of a continuous wall of glass plates providing an uninterrupted external facade and substantially uninterrupted interior vision is solved in an ingenious manner by means of the invention which enables large glass plates to be suspended in a substantially moment-free manner. The mountings permit sufficient freedom of movement to the plates from the mountings. Resilient constraints may be provided, e.g., by cables under tension, to limit the amount of movement within the array and this may be independently controlled.

In accordance with one aspect of the invention there is provided a mounting particularly but not exclusively suitable for the moment-free suspension of plates, e.g., of glass, comprising a ball member and a socket member joined to permit spherical pivoting motion, the socket member being securable through a bore in the plate with the point of pivot generally in the median plane of the plate, and the ball member having a ball portion rigid with a stem portion which is connectable to a support structure.

The invention includes use of such a mounting for the moment-free suspension of one or more glass plates.

The invention also includes as an aspect an array of glass plates arranged edge to edge and suspended utilizing such a mounting in a substantially moment-free manner which permits limited deformation of the array, e.g., under wind force.

Other characteristics and advantages of the present invention can be shown more clearly when reading the description hereafter given as an illustrative example only based on the enclosed drawings of one embodiment of the mounting of this invention.

BRIEF DESCRIPTION OF THE DRAWINGS

FIG. 1 illustrates in divided cross-section a mounting according to the invention secured to a glass plate.

FIG. 2 is a partly exploded and partly cross-sectional perspective view of part of an array of glass plates according to the invention.

FIG. 3 is a perspective view further illustrating the manner in which the array is supported.

DETAILED DESCRIPTION OF THE PREFERRED EMBODIMENT

Turning to FIG. 1 there is shown a mounting I comprising a ball member 10 and a socket member 12 joined to permit spherical pivoting motion, the socket member being secured through a bore 19 in a glass plate P with the point of pivot X generally in the median plane of the plate. The ball member 10 has a ball portion 11 rigid with a stem portion 13, the stem portion being connectable to a support structure.

The ball member and socket member are preferably of stainless steel. The ball member may be of 17/4/PH grade and the socket of 306 grade.

The socket portion 12 has an enlarged head 20 having a frustoconical surface 21 designed to seat within a countersink 22 in the exterior surface of the plate P, which countersink extends to a depth less than half the thickness of the plate P. The frustoconical surface 21 joins with a cylindrical surface 23 which is threaded at 24, at the end opposite to the head, to receive a nut 14.

The socket member 12 is separated from the interior bore surface of the plate P by an annular gasket 15 of a material which is softer than that of the socket and plate. This may be a suitably weather-resistant plastics material but is preferably of annealed aluminum, e.g., 1000 grade, and, e.g., 2 to 3 mm thick.

The exterior surfaces of the head 20 and gasket 15 are preferably planar as shown so as to continue the exterior surface 25 of the plate P. As shown it is preferred to form the corresponding surface 26 of the ball portion to be planar also with the head, ball portion and gasket constituting a plane surface which will in use lie flush with the surface 25 of the plate.

The stem portion 13 had its axis Y—Y passing through the point of pivot X and normal to the surface 26. The stem portion 13 of the ball member comprises a flange 27 which connects with the ball portion 11 via a neck 28 which tapers from the flange to the ball portion. The socket portion 12 has an internal surface portion 29 adjacent the neck which is outwardly flared and spaced from the neck 28 by a gap 18. The tapering of the neck and the flare of the surface 29 are frustoconical and of differing conical angles so that the bounding surfaces of the gap 18 in the central position of the stem portion are V-shaped in cross-section. These surfaces are generally radial to the point X and constitute terminal abutting surfaces defining the limits of pivot.

To provide a degree of resilience in the permitted pivoting motion of the ball member relative to the socket member, a damping ring 17 of resilient material such as rubber is present at least partly within the gap 18 and is secured in position by the flange 27 as illustrated.

The socket member is deformed around the ball portion in known manner. The diameter of the flange 27 is less than the diameter of the cylindrical portion 23 of the socket member so that the unit composed of the ball member and socket member can be inserted through the plate P from the exterior with the gasket 15 in position around the socket member. The unit can then be secured in place by means of the nut 14 to a desired looking pressure. A washer 16, e.g., of plastic, is present between the nut 14 and plate P. The gasket 15 extends beyond the thickness of the plate P generally by the thickness of the washer 16. To allow for any possible protrusion of the gasket 15, the nut 14 is countersunk at 30.

A specific mounting will normally be designed for a given thickness of plate to enable the point of pivot X to lie appropriately close to the median plane of the plate for maximum performance. However, small departures, e.g., of 1 or 2 mm, within a thickness of plate of, e.g., 12 mm, may be accommodated. The nut 14 is also preferably of stainless steel, e.g., of 306 grade.

It would be apparent that the mounting permits the glass plate to pivot within the constraints of the gap 18 so that with the stem portion supported horizontally no moment reaction forces will be transmitted through the plate, so that any bending moment supplied, e.g., by wind force, will cause the plate to pivot and remain moment-free. To provide lateral movement (along the axis Y—Y) the stem portion 13, e.g., in the case of centrally situated plates of an array, may be supported against a resilient supporting structure formed of prestressed cables. The mounting shown is very strong and when constructed generally in the proportions indicated in FIG. 1, a column of 2 m×2 m glass plates may be suspended from one another using the mountings at the corners.

FIGS. 2 and 3 illustrate the manner in which the mountings may be utilized to support an array of plates constituting a continuous building wall. This mode of construction has been utilized subsequent to the priority date of this application in the construction of the City of Science and Industry in Paris and a further description will be found in volume 364 (February/March 1986) of the International Review of Architecture and Design ("Techniques and Architecture"). The disclosure of such publication is incorporated by reference.

At each intersection between four plates there is provided an H-shaped coupling having a central horizontal strut 40 the ends of which are journaled by means of female bearing members 41 and axle members 42 to upright struts 43. Similar bearing members 44 journally connect each end of the upright struts 43 to the stem portions 13 of mountings I, the ends of the stem portions 13 being threaded to receive a washer 45 and nut 46. Gaps 60 between plates P are filled with a resilient sealant 62 to form a flexible yet weather tight joint.

A central strut 40 has a conical bearing extending towards the interior normal to the plane of the glass to journally receive a damping strut 50.

As shown in FIG. 3 the ends of the damping struts 50 are supported against a prestressed cable 51 arranged in a bow which is convex from the exterior. A second, oppositely bowed cable 52 connects the struts 50 at intermediate positions. The cables provide a controlled degree of resistance to bowing of the whole array under wind force.

In the building described, square plates of 2 m dimension are arranged in larger squares of four plates by four plates each square being supported from a horizontal beam by a suspension mounting (not shown) at the center of the upper edge portion of each plate in the upper row which allows the plate to pivot around a pivot axis similarly to those illustrated. Mountings I as illustrated are arranged at each corner of each plate and are used to take the weight of the plates (as well as for bracing as described) except for those in the upper row, which are used only for horizontal bracing. It will be apparent that considerable bowing of each composite panel is permitted under wind force without applying moment forces to the glass at its attachment points.

We claim:

1. A mechanical joint for supporting a vertically oriented plate comprising:
    a stem having first and second ends;
    a head having reduced sized first end and enlarged sized second end;
    articulated means for mounting the head to the second stem end for articulated movement relative to the stem;
    said first end of said stem and said head sized to pass through a hole in the plate, said second head end sized to prevent said head from passing completely through the hole in the plate; and
    means for securing the plate to said head.

2. The mechanical joint of claim 1 wherein the articulated mounting means includes a spherical end portion of said second stem end and a complementary spherical opening defined by said head for receipt of said spherical end portion.

3. The mechanical joint of claim 1 wherein said securing means comprises a threaded nut and complementary threads on said head whereby said nut biases the plate against the head second end to secure the head to the plate.

4. The mechanical joint of claim 1 wherein the second ends of the stem and head terminate in a common plane generally perpendicular to an axis of the stem.

5. The mechanical joint of claim 1 wherein the head has a tapered surface for mating engagement with a complementarily tapered surface defining the hole in the plate.

6. The mechanical joint of claim 4 wherein the head has a tapered surface for mating engagement with a complementarily tapered surface defining the hole in the plate so that an outer surface of the plate is generally coplanar with the common plane.

7. The mechanical joint of claim 1 further comprising a spacer element between the plate and the head.

8. The mechanical joint of claim 3 further comprising a washer-like spacer element between the nut and the plate.

9. The mechanical joint of claim 1 further comprising a shock absorbing member between the head and the stem sensitive to relative angular displacement between the stem and the head.

10. A mechanical joint for supporting a vertically oriented plate comprising:
    a stem having a support structure end and a spherical end;
    a head having reduced sized first end and enlarged sized second end with a spherical opening sized for mating engagement with the spherical stem end for articulated movement relative to the stem;
    said first end of said stem and said head szied to pass through a hole in the plate, said second head end sized to prevent said head from passing completely through the hole in the plate, the head having a tapered surface for mating engagement with a complementarily tapered surface defining the hole in the plate, the spherical stem end and enlarged second end of the head terminating in a common plane generally perpendicular to an axis of the stem;

means for securing the plate to said head including a threaded nut and complementary threads on said head whereby said nut biases the plate against the head second end to secure the head to the plate; and a shock absorbing member between the head and the stem sensitive to relative angular displacement between the stem and the head.

11. A mounting particularly but not exclusively suitable for the moment-free suspension of plates, e.g., of glass, comprising a ball member and a socket member joined to permit spherical pivoting motion, the socket member being securable through a bore in the plate with the point of pivot generally in a median plane of the plate, and the ball member having a ball portion rigid with a stem portion which is connectable to a support structure.

12. A mounting according to claim 11 wherein the socket portion has an enlarged head opposite to the stem portion, and the head and ball portion terminate in a plane surface.

13. A mounting according to claim 12 wherein the stem portion has an axis passing through the point of pivot and normal to said plane surface.

14. A mounting according to claim 13 wherein the head has a frustoconical surface joining a cylindrical surface of the socket portion which is threaded at the end opposite to the head.

15. A mounting according to claim 13 in which the stem portion comprises a flange and a neck tapering from the flange to the ball portion and the internal surface of the socket portion adjacent to the neck is outwardly flared and spaced from the neck and wherein a damping ring of resilient material is present at least partly within such space and secured by said flange.

16. A mounting according to claim 1 wherein said socket member is separated from the bore surface by an annular gasket of material softer than that of the socket member.

17. A mounting according to claim 6 wherein the said gasket is of aluminum.

18. A mounting according to claim 6 wherein said socket member is secured to said plate by a nut having a countersink to receive any protruding part of said gasket and wherein a resilient washer is provided for separating said nut from said plate.

19. A wall area comprising:

a plurality of glass plates, the glass plates having front and back surfaces and edges circumscribing the front and back surfaces;

glass plates mounting structures each comprising:
   a socket member; and
   a ball member joined to the socket member for spherical pivoted motion about a pivot point, the ball member including a ball portion and a stem portion extending rigidly from the ball portion;

the plates having bores extending through the front and back surfaces sized for receipt of the socket members with the pivot points in median planes of the plates; and a support structure, secured to the stem portions, for suspending the glass plates in an array arranged edge to edge, the mounting structures and the support structure providing substantially moment-free support of the glass plates to permit limited deformation of the array of glass plates due to wind load.

20. A wall area according to claim 19 in which the support structure includes prestressed cables.

21. A wall area according to claim 20 wherein the support structure includes struts coupled to the prestressed cables through pivot joints.

22. A wall area according to claim 19 wherein each glass plate has corners and has a glass plate mounting structure secured thereto at each of said corners.

23. A wall structure, for use with a supporting structure, exposed to wind force comprising:

a plurality of glass plates each having front, back and edge surfaces;

the plates being arranged in a planar array, including an upper row and lower rows beneath the upper row, with adjacent edge surfaces separated by a resilient sealant, the plates having corners positioned adjacent one another;

joints interconnecting each group of the adjacent corners of the plates in an essentially moment-free manner;

means for suspending plates of the upper row in an essentially moment-free manner from the supporting structure;

means for suspending the plates of the lower rows in an essentially moment-free manner from the plates above; and a bracing structure of controlled resilience horizontally engaged with said joints for the controlled restriction of bowing of the wall under wind force.

24. The wall structure of claim 23 wherein the joints are ball and socket joints.

* * * * *